US012537093B2

(12) United States Patent
Baek et al.

(10) Patent No.: US 12,537,093 B2
(45) Date of Patent: Jan. 27, 2026

(54) METHODS, SYSTEMS, APPARATUSES, AND DEVICES FOR FACILITATING CREATING LABELS FOR LABELING INTRAVENOUS INFUSION LINES

(71) Applicants: Vigilant Software, Trophy Club, TX (US); Peter Baek, Southlake, TX (US); John Fox Holt, Dallas, TX (US)

(72) Inventors: Peter Baek, Southlake, TX (US); John Fox Holt, Dallas, TX (US)

(73) Assignee: VIGILANT SOFTWARE, Trophy Club, TX (US)

( * ) Notice: Subject to any disclaimer, the term of this patent is extended or adjusted under 35 U.S.C. 154(b) by 206 days.

(21) Appl. No.: 18/037,778

(22) PCT Filed: Sep. 12, 2022

(86) PCT No.: PCT/US2022/043185
§ 371 (c)(1),
(2) Date: May 19, 2023

(87) PCT Pub. No.: WO2023/039235
PCT Pub. Date: Mar. 16, 2023

(65) Prior Publication Data
US 2024/0087728 A1    Mar. 14, 2024

(51) Int. Cl.
*G09F 3/02* (2006.01)
*B65C 9/00* (2006.01)
(Continued)

(52) U.S. Cl.
CPC ........... *G16H 40/20* (2018.01); *B65C 9/0015* (2013.01); *G06K 15/024* (2013.01);
(Continued)

(58) Field of Classification Search
CPC .............. A61J 2205/30; B65C 9/0015; B65C 2210/0051; G06K 15/024; G09F 3/0288;
(Continued)

(56) References Cited

U.S. PATENT DOCUMENTS 7,621,216 B2 *  11/2009  Jacobs ..................... G09F 3/10
                                                           101/368
8,025,314 B2 *  9/2011   Adler ........................ A61J 7/04
                                                           40/310
(Continued)

FOREIGN PATENT DOCUMENTS

EP         3869407 A1 *  8/2021  ............ B41J 29/393
WO    WO-2010053702 A1 *  5/2010  ........ A61M 5/14212

*Primary Examiner* — Christopher E Mahoney
*Assistant Examiner* — Marissa Ferguson-Samreth
(74) *Attorney, Agent, or Firm* — Dhiraj Jindal; PATENT YOGI LLC

(57) ABSTRACT

The present disclosure provides a method of creating a label for labeling an intravenous infusion line. Further, the method may include receiving an information associated with one or more intravenous infusion lines from input devices, analyzing the information, determining label content of labels associated with the intravenous infusion lines, determining label content formats of the label content, generating a label information for the labels based on the label content and the label content formats, and printing the label information on label sheets based on the generating of the label information. Further, the printing of the label information creates the labels for the intravenous infusion lines.

16 Claims, 17 Drawing Sheets

(51) Int. Cl.
  *G06K 15/02* (2006.01)
  *G09F 3/00* (2006.01)
  *G09F 3/10* (2006.01)
  *G16H 20/17* (2018.01)
  *G16H 40/20* (2018.01)
  *G16H 40/67* (2018.01)

(52) U.S. Cl.
  CPC .......... *G09F 3/0288* (2013.01); *G09F 3/0295* (2013.01); *G09F 3/10* (2013.01); *G16H 20/17* (2018.01); *G16H 40/67* (2018.01); *A61J 2205/30* (2013.01); *B65C 2210/0051* (2013.01); *G09F 2003/0201* (2013.01); *G09F 2003/0202* (2013.01)

(58) Field of Classification Search
  CPC .. G09F 3/0295; G09F 3/10; G09F 2003/0201; G09F 2003/0202; G16H 20/17; G16H 40/20; G16H 40/67
  See application file for complete search history.

(56) References Cited

U.S. PATENT DOCUMENTS

| | | | |
|---|---|---|---|
| 10,832,025 B1* | 11/2020 | Baek | G16H 20/13 |
| 2008/0090724 A1* | 4/2008 | Mistyurik | B65C 11/0226 |
| | | | 503/207 |
| 2014/0237873 A1* | 8/2014 | Garay-Marrero | G09F 3/0288 |
| | | | 40/674 |
| 2016/0321480 A1* | 11/2016 | Hamlin | G16Z 99/00 |
| 2020/0118468 A1* | 4/2020 | Nordquist | B32B 7/06 |

* cited by examiner

METHODS, SYSTEMS, APPARATUSES, AND DEVICES FOR FACILITATING CREATING LABELS FOR LABELING INTRAVENOUS INFUSION LINES

FIELD OF THE INVENTION

Generally, the present disclosure relates to the field of data processing. More specifically, the present disclosure relates to methods, systems, apparatuses, and devices for facilitating creating labels for labeling intravenous infusion lines.

BACKGROUND OF THE INVENTION

The field of data processing is technologically important to several industries, business organizations, and/or individuals.

Intravenous infusions are among the most common methods of administering medications at healthcare facilities. As intravenous infusions may contain powerful narcotic drugs, and patients may receive multiple infusions concurrently, there exists a significant risk of negative patient outcomes due to medication errors. Healthcare staff may misidentify infusion lines and make mistakes while changing or adjusting infusions, oftentimes with fatal consequences. Within ICUs, where patients commonly receive multiple infusions over long periods of time, these types of medication errors account for up to 78% of serious medical errors.

A second significant risk factor for patients receiving intravenous infusions, particularly those administered for many hours, is that of central line-associated bloodstream infection (CLABSI). These dangerous bloodstream infections, with a 12-25% mortality rate, occur when pathogens enter a patient's bloodstream through the infusion apparatus. The frequency of such infections in American hospitals has been reported to be 0.8 CLABSI events per 1,000 central line days. To avoid the aforementioned medication errors and CLABSI events, best practices adopted by hospitals require that healthcare staff label intravenous infusion lines. Typical requirements include drug name, date and time of administration, name of staff administering the infusion, required change time for the tubing (to prevent CLABSI events), as well as tagging the tubing at multiple points to aid in line-tracing when making adjustments (another best practice).

Typical labeling methods suffer from many drawbacks. Healthcare staff is typically advised to label infusions with a combination of preprinted and handwritten labels. This may result in labels of poor quality, with illegible handwriting, and/or human errors such as miscalculating required tubing change time. Further, the use of ad hoc label materials such as medical tape is common. The process is also tedious and time-consuming, typically taking over a minute to properly label a single infusion. Compliance with labeling requirements by staff is low, with multi-hospital surveys showing that up to 60.1% of infusion labels do not contain all required information and 35.0% of tubing is not tagged according to policy. Thus, there is significant room for improvement in staff workflow, compliance, and patient safety.

Therefore, there is a need for improved methods, systems, apparatuses, and devices for facilitating creating labels for labeling intravenous infusion lines that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present disclosure provides a system for creating a label for labeling an intravenous infusion line. Further, the system may include a communication device which may be configured for receiving one or more information associated with one or more intravenous infusion lines from one or more input devices. Further, the system may include a processing device communicatively coupled with the communication device. Further, the processing device may be configured for analyzing the one or more information. Further, the processing device may be configured for determining one or more label content of one or more labels associated with the one or more intravenous infusion lines based on the analyzing. Further, the processing device may be configured for determining one or more label content formats of the one or more label content based on the determining of the one or more label content. Further, the processing device may be configured for generating one or more label information for the one or more labels based on the one or more label content and the one or more label content formats. Further, the system may include a printing device communicatively coupled with the processing device. Further, the printing device may be configured for printing the one or more label information on one or more label sheets based on the generating of the one or more label information. Further, the printing of the one or more label information creates the one or more labels for the one or more intravenous infusion lines.

The present disclosure provides a method of creating a label for labeling an intravenous infusion line. Further, the method may include receiving, using a communication device, one or more information associated with one or more intravenous infusion lines from one or more input devices. Further, the method may include analyzing, using a processing device, the one or more information. Further, the method may include determining, using the processing device, one or more label content of one or more labels associated with the one or more intravenous infusion lines based on the analyzing. Further, the method may include determining, using the processing device, one or more label content formats of the one or more label content based on the determining of the one or more label content. Further, the method may include generating, using the processing device, one or more label information for the one or more labels based on the one or more label content and the one or more label content formats. Further, the method may include printing, using a printing device, the one or more label information on one or more label sheets based on the generating of the one or more label information. Further, the printing of the one or more label information creates the one or more labels for the one or more intravenous infusion lines.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
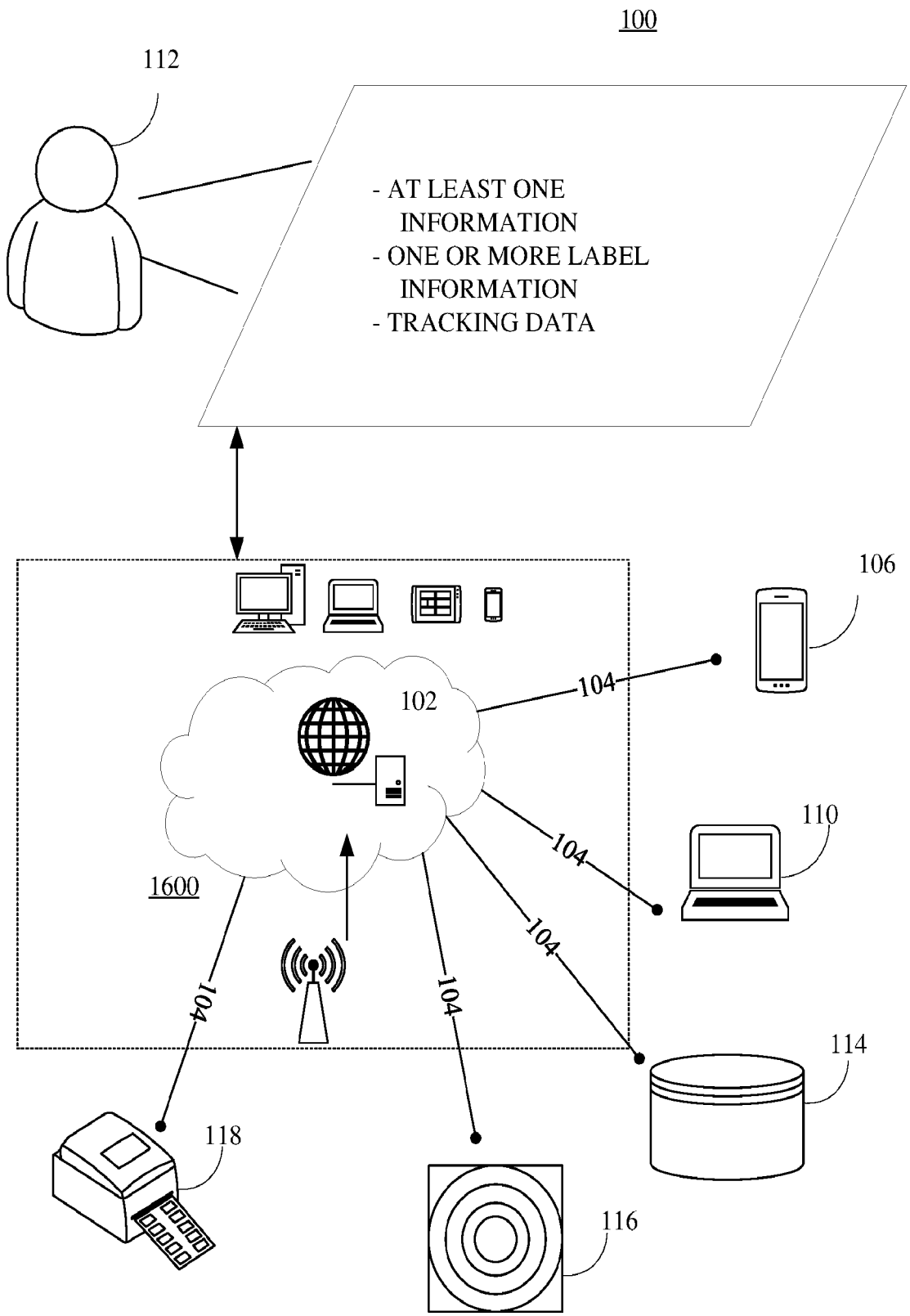
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems, methods, apparatus, and devices for creating labels for labeling intravenous infusion lines, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part.

Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Glossary

In some embodiments, a communication device is a hardware device or an electronic device that is capable of transmitting an analog or digital signal over communication channels such as telephone lines, other communication wires, or wirelessly. An example of a communication device is a computer modem, which converts a computer's digital information to an analog signal for transmission over a telephone line. Further, the communication device may be a communication interface and/or a computing device with a communication connection.

In some embodiments, the communication device may be an electronic device that can be used for data and/or signal transmission and reception.

In some embodiments, an intravenous infusion line may be a soft, flexible tube placed inside a vein, usually in the hand or arm. Further, health care providers may use the intravenous infusion line to give a person and/or a user medicine or fluids intravenously.

In some embodiments, at least one information may include user information associated with the user of the intravenous infusion line, medicine information associated with medicines delivered using the intravenous infusion line, doctor information associated with doctors that prescribed the medicine which is delivered to the user using the intravenous infusion line, etc. Further, the user information may include user identifiers such as name, age, sex, disease, etc. Further, the medicine information may include medicine's names, medicine prescribed dosages, medicine expiry dates, medicine usage conditions, medicine storage conditions (storage temperature), etc.

In some embodiments, an input device may be a piece of equipment or an electronic device used to provide data and control signals to an information processing system, such as a computer, a computing device, or an information appliance.

In some embodiments, the input device may include at least one of an optical scanner, an RFID reader, and the computing device.

In some embodiments, the optical scanner may include a device found within most computer scanners that capture visual information and translate the visual information (image) into digital information that the computer is capable of understanding and displaying.

In some embodiments, the optical scanner is configured for scanning at least one visual representation of the at least one information present on at least one physical object.

In some embodiments, the radio-frequency identification (RFID) reader uses electromagnetic fields to automatically identify/detect and track tags attached to objects. Further, the tags may include information about the objects.

In some embodiments, the RFID reader may include a radio transponder, a radio receiver, and a transmitter.

In some embodiments, at least one label content format may include a color code for one or more label content associated with a label. Further, the color code may include at least seven different colors corresponding to seven days of a calendar week. Further, the at least one label content format may include a position, an arrangement, a size, a color, a texture, etc of each of the one or more label content of the label.

In some embodiments, one or more label sheets may include a piece of paper attached to medicine bottles, infusion bottles, etc. comprising the one or more label content.

In some embodiments, one or more labels may include a primary label and one or more secondary labels.

In some embodiments, one or more secondary labels may include a piece of paper attached to a medicine bottle comprising a drug name and administration location information.

In some embodiments, a primary label may include a piece of paper attached to a medicine bottle comprising primary label content such as user's information, medicine information, time and date of administration, a required tubing change time for intravenous infusion, a drug-specific warning, and location of the infusion's administration.

In some embodiments, the one or more label content may include user information, medicine information, time and date of administration, required change time for the infusion tubing, drug-specific warnings, and location of the infusion's administration on a patient, etc.

In some embodiments, the one or more label content may include prescription labeling comprising a written, printed, or graphic matter upon any drugs or any of its containers, or accompanying such a drug. Further, the one or more label content may seek to identify drug contents and to state specific instructions or warnings for administration, storage, and disposal.

In some embodiments, a processing device is an electronic circuitry or an electronic device (processor, microprocessor, etc.) that executes instructions comprising a computer program. The processing device performs basic arithmetic, logic, controlling, and input/output (I/O) operations specified by the instructions in the program. Further, the processing device may be a processor and/or a processing unit.

In some embodiments, the processing device may be circuitry for determining the one or more label content and the at least one label content format of the one or more labels based on the one or more label content.

In some embodiments, a printing device may be a machine that makes a persistent representation of graphics or text, usually on paper. While most representation is human-readable and some are non human-readable, bar code printers are an example of expanded use for printers. Different types of printers include 3D printers, inkjet printers, laser printers, and thermal printers.

In some embodiments, the printing device may include a printer such as a thermal printer, a laser printer, etc. configured for printing the one or more label information on the one or more label sheets.

Further, the thermal printer uses heat for printing. Further, the one or more label sheets may be a paper with a thermochromic coating which is known as a thermal paper. Further, the thermochromic coating of the paper turns to different colors with different textures when the thermochromic coating is heated at different temperatures by the thermal printer. Further, the one or more labels may be the one or more label sheets with the one or more label information printed on a first side of the one or more label sheets and a coating of an adhesive on a second side opposite to the first side of the one or more label sheets. Further, the adhesive allows attaching the second side of the one or more label sheets to the intravenous infusion line, medicine bottles, infusion bottles, etc.

Further, the one or more label information may be a visual representation of the label generated by the processing device.

In some embodiments, a drug database is an organized collection of data stored and accessed electronically. Further, the drug database may be stored on a file system, while large databases are hosted on computer clusters or cloud storage.

In some embodiments, a sensor is an electronic device that produces an output signal for the purpose of sensing a physical phenomenon.

In some embodiments, the sensor may be configured for generating a tracking data associated with a labeling activity.

In some embodiments, the tracking data may include information, generated by the sensor, associated with a labeling activity. Further, the labeling activity may include an act of scanning the at least one visual representation of the at least one information present on the at least one physical object, an act of generating the label information, an act of printing the label by printing the label information on the one or more label sheets, an act of attaching the label to the intravenous infusion line, the medicine bottle, infusion bottle, etc., etc. Further, the tracking data may include a location and a time for the labeling activity.

In some embodiments, a biometric sensor may be used to collect measurable biological characteristics (biometric signals) from a human being, which can then be used in conjunction with biometric recognition algorithms to perform automated person identification.

In some embodiments, the biometric sensor may be configured for generating biometric data of a label administrator.

In some embodiments, a biometric data may include information generated by the biometric sensor.

In some embodiments, an external device may include an electronic device configured for receiving the tracking data and the at least one information for auditing.

Overview

The present disclosure describes systems, methods, apparatus, and devices for creating labels for labeling intravenous infusion lines. Further, the disclosed system provides rapid and effective means to create detailed infusion line labels in line with best practices, each label consisting of one or more adhesive stickers created at one time via a thermal printer. This, in turn, greatly reduces the time and effort to label intravenous infusion lines, while also ensuring consistency, legibility, and compliance of intravenous line labels and their contents. Additionally, the disclosed system contains a database of National Drug Codes (NDCs) as well as how long each NDC drug may be administered intravenously before the infusion's tubing must be changed. The disclosed system is programmed to calculate the date and/or time at which an infusion's tubing must be changed at the time of label creation and to display this information in the label's contents with or without color coding, with varying colors representing the days of the week. This reduces, if not eliminates, human error in calculating required infusion tubing change times.

The disclosed system prints an intravenous infusion line label when prompted to do so by the scan of a medication's barcode. This may be done with the use of a scanner connected to the device, or by a mobile computer or stationary computer running proprietary software, which is paired wired or wirelessly to the device. In the case of using a scanner, the device's user can also scan their own identification barcode before a label is printed to provide the device with the label administrator's information. In the case of using a mobile computer or stationary computer, the administrator provides the software with their information at log-in, which is maintained on the device and applied to any labels created via scan with this mobile device until the label administrator is logged out of the software. These and other unique features of the disclosed system and methods are discussed below and illustrated in the accompanying drawings.

Further, the disclosed system describes the printing of the label when the drug is not present due to an incomplete database. The disclosed system prompts the user/nurse/ doctor to select the drug or the number of hours to expire so they can simply hand-write the drug name.

Further, some nursing units don't even scan but use this menu i.e. neonatal ICUs (NICUs) have a smaller subset of drugs used and have primarily compounded drugs (Compounded drugs often have barcodes specific to the patient so the drug code will not be in our database.

Further, the nurses use the system to print non-IV drug labels for tubes that are coming out of the patient such as chest tubes or foleys. These tubes are also changed based on time. These are selected in our menu similar to drugs not found when scanned.

Further, the disclosed system describes some IV lines that are connected to a previously implemented IV line (or primary line) via a Y port. These are called secondary or piggyback IV lines. Many hospitals change these IV lines within 24 hours overriding normal rules. i.e. Morphine will usually be changed in 96 hours if associated with a primary line but if it is associated with a secondary line then it needs to be changed in 24 hours. The reasoning is the Y port creates a higher potential for infection. The disclosed system needs to understand if it is a primary line therefore a barcode is affixed to the printer to accept that metadata first which distinguishes between the primary IV line and the secondary IV line. When the nurse needs a label for the secondary line, he/she scans that barcode and then the drug barcode. If it is a primary line, they simply scan the drug name.

Further, the printer of the disclosed system queries a hospital database after the barcode scan. Occasionally, the disclosed system doesn't have the drug barcode the nurse scans (For example in the case of compounded drugs). The disclosed system may query a database to get information on that drug to print the label(s).

Further, the disclosed system describes one of the labels that can be applied to a syringe (that is being used to add drugs to an IV bag) or dressing.

The disclosed system and method of use will be understood, both as to its structure and operation, from the accompanying drawings, taken in conjunction with the accompanying description. It should also be understood that the mixing and matching of features, elements, and/or functions of one embodiment may be incorporated into another embodiment as appropriate unless described otherwise.

Further, the present disclosure describes a labeling system. Further, the labeling system includes a printer either operably associated with a scanner conductively connected thereto via a cord or associated with a mobile or stationary computer which includes a scanner. The printer includes a top pivotally connected to a base configured to carry label sheets therein. During use, the user can pivot open the top to position the label sheets within a cavity formed by the base. The label sheets are fed through a printing device enclosed within the base and exit through an opening where they are accessible to the user.

The printer is further provided with a display carried on top and in viewing access to the user. In one contemplated embodiment, the display displays information related to creating labels e.g., staff information, medicine information, date, time, and so forth, in addition to displaying prompts (e.g., "Scan Drug NDC") and information related to the device's setup and settings. In an alternative embodiment, the display is manipulated by the user to manually input information, for example, with the use of a touch screen. The display may also be configured to read fingerprints for security verification prior to use.

Further, the printer includes one or more ports that allow communication with a computer for preprogramming. Additionally, the printer in the contemplated embodiment includes a power cord that provides electrical energy to the printer via an electrical outlet.

One of the unique features believed characteristic of the disclosed system is the use of a scanner to obtain information for printing the labels on a sheet or the label sheet. This feature greatly reduces the time and effort to create medical labels for intravenous infusion lines and potentially eliminates human error in the process.

The scanner includes a handle integrally attached to a reader. During use, the user may hold the handle and scan, for example, a barcode associated with the user's identification and a barcode associated with the type of medicine being used, as indicated by a box. It should be understood that the majority of medicine bottles include barcodes adhered to the bottle, which provide important medical information. Thus, the box may represent a barcode directly from the medicine bottle.

Further, an intravenous infusion line label sheet includes multiple labels which are created concurrently and are adhesively bonded to the sheet. The primary label contains key information related to the infusion. One or more secondary labels intended for tagging the infusion tubing in multiple places may be printed concurrently with the primary label. During use, a plurality of label sheets may be placed in the cavity of the base and thereafter fed through a printer device and the drug and user information from a scanner is placed on individual labels via thermal printing. The user then removes labels from the sheet and adhesively adheres the labels to the intravenous infusion tubing. In some embodiments, the labels could remain blank or contain only prompts for information, on which the user could then handwrite the necessary information.

Further, the user's information, medicine information, time and date of administration, required change time for the infusion tubing, drug-specific warnings, and location of the infusion's administration on the patient can be printed on the labels via the printer. Specifically, the label contains the drug name in section, date of administration in section, time of administration in section, required tubing change time printed in section, color-coded required tubing change time alert in section, the user (administrator) information in the section, drug warning in section, and drug type information in the section. The label contains the drug name in the section and administration location information in the section.

Further, the present disclosure describes a process that begins with obtaining the user's information, which can be achieved via scanner, through input into a mobile computing device, a radio-frequency identification (RFID) badge, or the like, as indicated by a box. The disclosed system may maintain the user's information for some amount of time to negate the need to reinput the user's information at each label creation, thus saving time. After the user's information is received, the user scans a medicine barcode, as indicated by the box. The disclosed system then identifies the scanned drug's identity in its preprogrammed database, calculates the required tubing change time for intravenous infusion tubing with this drug, and prints labels on the label sheet, containing the user's information, drug information, and required intravenous infusion tubing change time, as indicated by the box.

Further, the present disclosure describes the use of a special sheet that contains 3 labels. The main label has 7 different colors that correspond to the day of the week. This helps ICU nurses look at IV lines to understand if they need to change the tubing. Additionally, 3 labels are created so the nurse can apply labels to different parts of the IV tube—above the pump, below the pump, and near insertion.

Another characteristic feature of the disclosed system is the ability to be networked and be operably associate with an external database and cloud service. Accordingly, the disclosed system may have the ability to be reprogrammed wirelessly, as well as communicate information on its activity wirelessly to an external database, program, and/or cloud service. The data obtained from the disclosed system in this way may be reviewed and/or analyzed by third parties. The ability to push updated software wirelessly to the disclosed system may further its ability to create accurate labels as new drugs are added to the FDA's NDC database and hospital-specific codes and their related information are updated. The ability to communicate information from the disclosed system to an external entity serves to enable compliance and labeling tracking, for example, by ICU nursing managers interested in tracking individual user's labeling activity. Further, the disclosed system may include additional transceivers and other devices to enable these features.

Further, the present disclosure describes a stand-alone programmable printer for creating labels for labeling intravenous lines.

Further, the present disclosure describes an app that connects to the printer via Bluetooth or network for creating labels for labeling intravenous lines.

Further, the present disclosure describes a desktop program or API plugin that sends the data to the printer via Bluetooth or network for creating labels for labeling intravenous lines.

Further, the present disclosure describes an automated labeling system that quickly creates compliant, easy-to-read intravenous infusion tube labels.

FIG. 1 is an illustration of an online platform 100 consistent with various embodiments of the present disclosure. By way of non-limiting example, the online platform 100 to facilitate creating labels for labeling intravenous infusion lines may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, sensors 116, actuators (not shown) and a device 118 (such as a device 1100) over a communication network 104, such as, but not limited to, the Internet. Further, users of the online platform 100 may include relevant parties such as, but not limited to, end-users, and administrators. Accordingly, in some instances, electronic devices operated by the one or more relevant parties may be in communication with the online platform 100.

A user 112, such as the one or more relevant parties, may access the online platform 100 through a web-based software application or browser. The web-based software application may be embodied as, for example, but not be limited to, a website, a web application, a desktop application, and a mobile application compatible with a computing device 1600.

Figure 2:
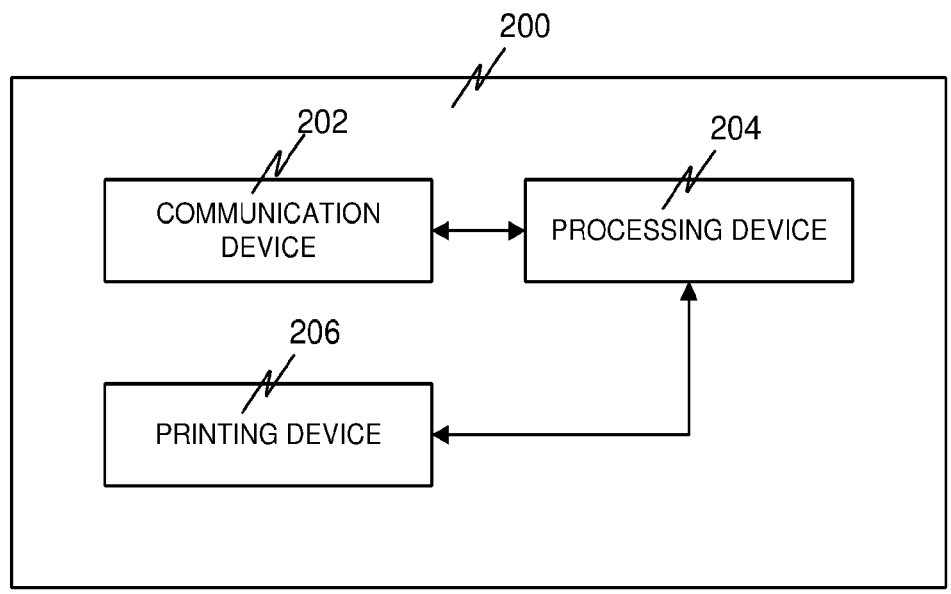
FIG. 2 is a block diagram of a system for creating labels for labeling intravenous infusion lines, in accordance with some embodiments.

FIG. 2 is a block diagram of a system 200 for creating labels for labeling intravenous infusion lines, in accordance with some embodiments. Accordingly, the system 200 may include a communication device 202, a processing device 204, and a printing device 206.

Figure 3:
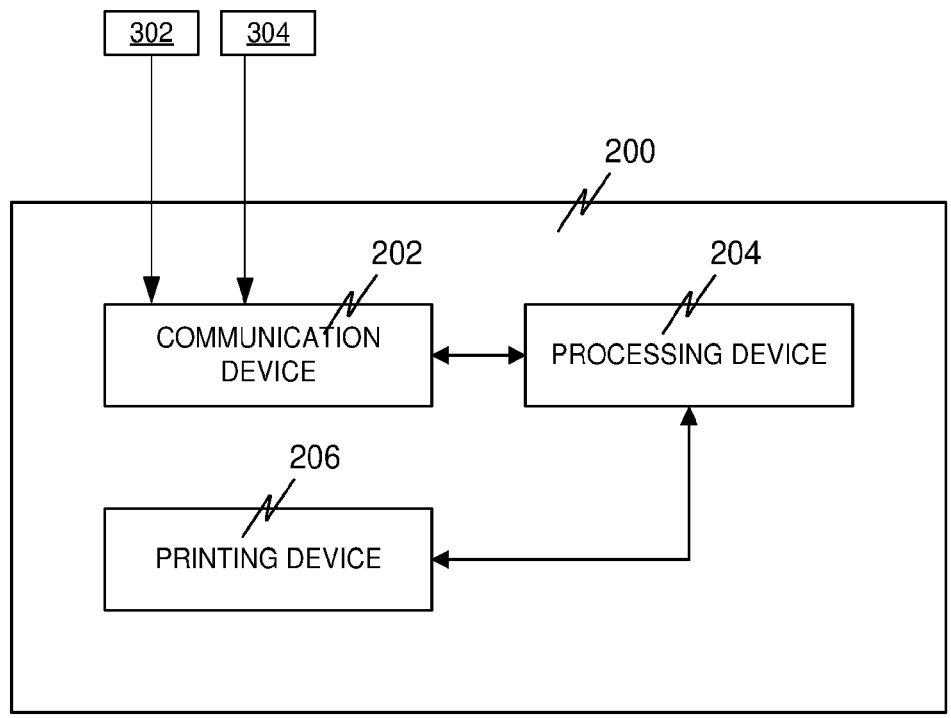
FIG. 3 illustrates a block diagram of the system for creating a label for labeling an intravenous infusion line, in accordance with some embodiments.

Further, the communication device 202 may be configured for receiving at least one information associated with at least one intravenous infusion line from one or more input devices 302-304 (as shown in FIG. 3). Further, the one or more input devices 302-304 may include a scanner, a RFID reader, a computing device, an IV infusion pump, etc. Further, the one or more input devices 302-304 may be configured for scanning at least one visual representation of the at least one information present on at least one physical object. Further, the at least one visual representation may include a QR code, a barcode, etc. Further, the at least one physical object may include a prescription, a medicine container, a tag, a user's identification, a medicine's identification, a doctor's identification, etc. Further, the at least one information may include user information, medicine information, doctor information, etc. Further, the computing device may include a smartphone, a laptop, a desktop, a smartwatch, etc.

Further, the processing device 204 may be communicatively coupled with the communication device 202. Further, the processing device 204 may be configured for analyzing the at least one information. Further, the processing device 204 may be configured for determining one or more label content of one or more labels associated with the at least one intravenous infusion line based on the analyzing. Further, the one or more label content may include user's information, medicine information, time and date of administration, required change time for the infusion tubing, drug-specific warnings, and location of the infusion's administration on a patient, etc. Further, the processing device 204 may be configured for determining at least one label content format of the one or more label content based on the determining of the one or more label content. Further, the at least one label content format may include a color code for the one or more label content. Further, the color code may include at least seven different colors for seven days of the week. Further, the processing device 204 may be configured for generating one or more label information for the one or more labels based on the one or more label content and the at least one label content format.

Further, the printing device 206 may be communicatively coupled with the processing device 204. Further, the printing device 206 may be configured for printing the one or more label information on one or more label sheets based on the generating of the one or more label information. Further, the printing of the one or more label information may create the one or more labels for the at least one intravenous infusion line. Further, the printing may include thermal printing of the one or more label information on the one or more label sheets. Further, the one or more label information may be thermally printed on the one or more label sheets. Further, the one or more label information may include the one or more label content in the at least one label content format.

In some embodiments, the one or more labels may include adhesive.

In some embodiments, the printing device 206 may include a thermal printer.

In some embodiments, the one or more input devices 302-304 may include one or more of an optical scanner, an RFID reader, and a computing device.

In some embodiments, the optical scanner may be configured for scanning one or more visual representations of the one or more information presents on one or more physical objects.

In some embodiments, the one or more label content formats may include a color code for the one or more label content. Further, the color code may include at least seven different colors corresponding to seven days of a calendar week.

In some embodiments, the one or more labels may include a primary label and one or more secondary labels. Further, a primary label content of the primary label may include user's information, medicine information, time and date of administration, a required tubing change time for intravenous infusion, a drug-specific warning, and location of the infusion' may s administration. Further, the one or more secondary labels may be configured for tagging the one or more intravenous infusion lines in one or more places of the one or more intravenous infusion lines. Further, the one or more secondary labels may include drug name and administration location information.

In some embodiments, the communication device 202 may be configured for receiving drug information associated with a drug from one or more drug databases. Further, the processing device 204 may be configured for calculating a required tubing change time for intravenous infusion of the drug based on the drug information.

FIG. 3 illustrates a block diagram of the system 200 for creating a label for labeling an intravenous infusion line, in accordance with some embodiments.

Figure 4:
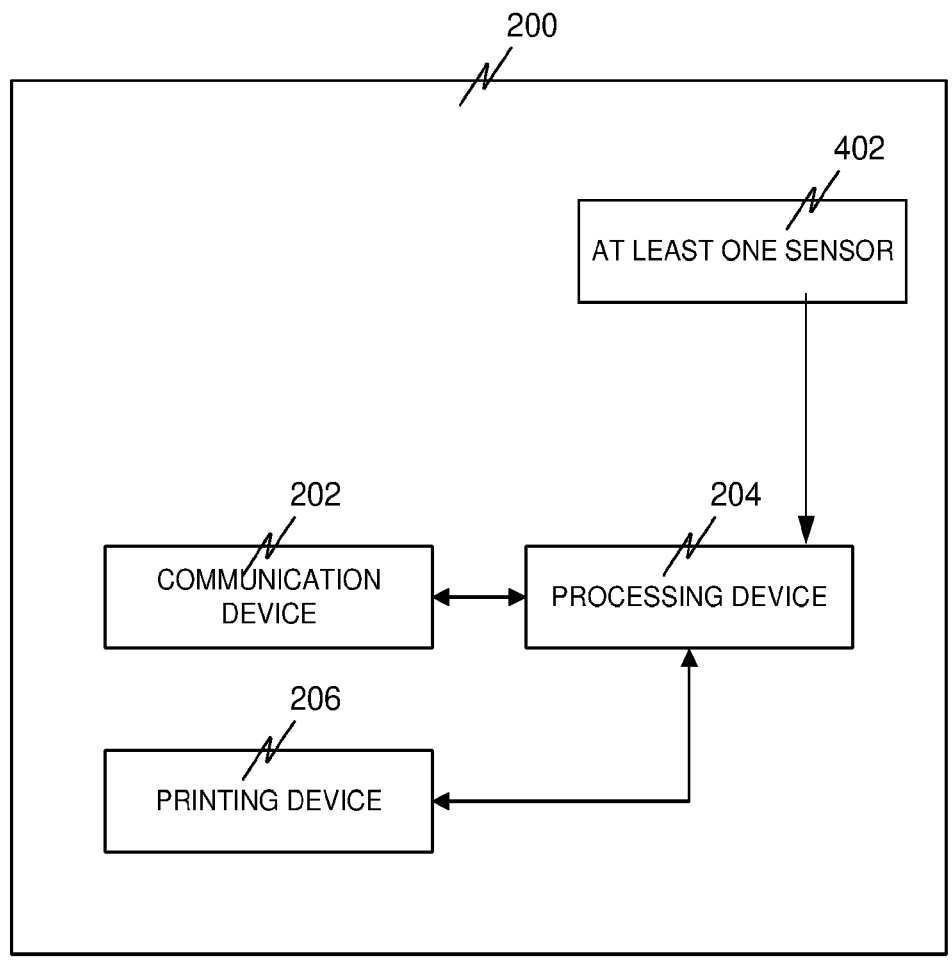
FIG. 4 illustrates a block diagram of the system for creating a label for labeling the intravenous infusion line, in accordance with some embodiments.

FIG. 4 illustrates a block diagram of the system 200 for creating a label for labeling the intravenous infusion line, in accordance with some embodiments.

Figure 5:
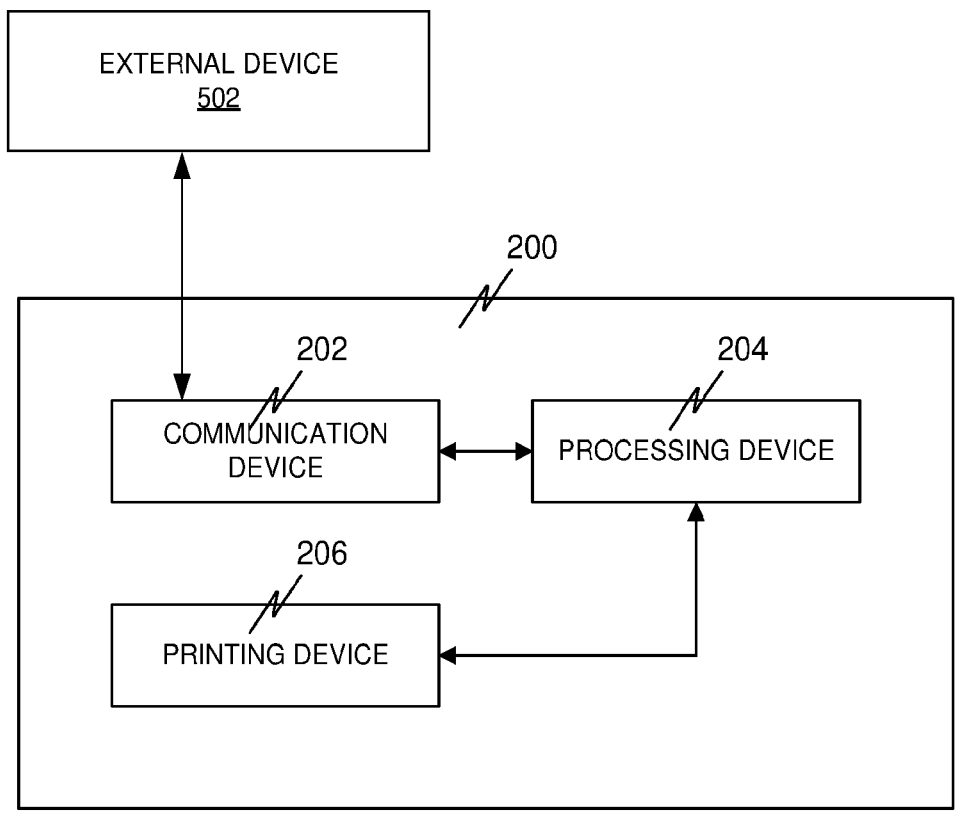
FIG. 5 illustrates a block diagram of the system for creating a label for labeling the intravenous infusion line, in accordance with some embodiments.

In some embodiments, the system 200 may include one or more sensors 402 (as shown in FIG. 4) communicatively coupled to the processing device 204. Further, the one or more sensors 402 may be configured for generating tracking data associated with a labeling activity. Further, the communication device 202 may be configured for transmitting each of the tracking data and the one or more information to an external device 502 (as shown in FIG. 5) for auditing. Further, the one or more information may include a label administrator's information.

FIG. 5 illustrates a block diagram of the system 200 for creating a label for labeling the intravenous infusion line, in accordance with some embodiments.

Figure 6:
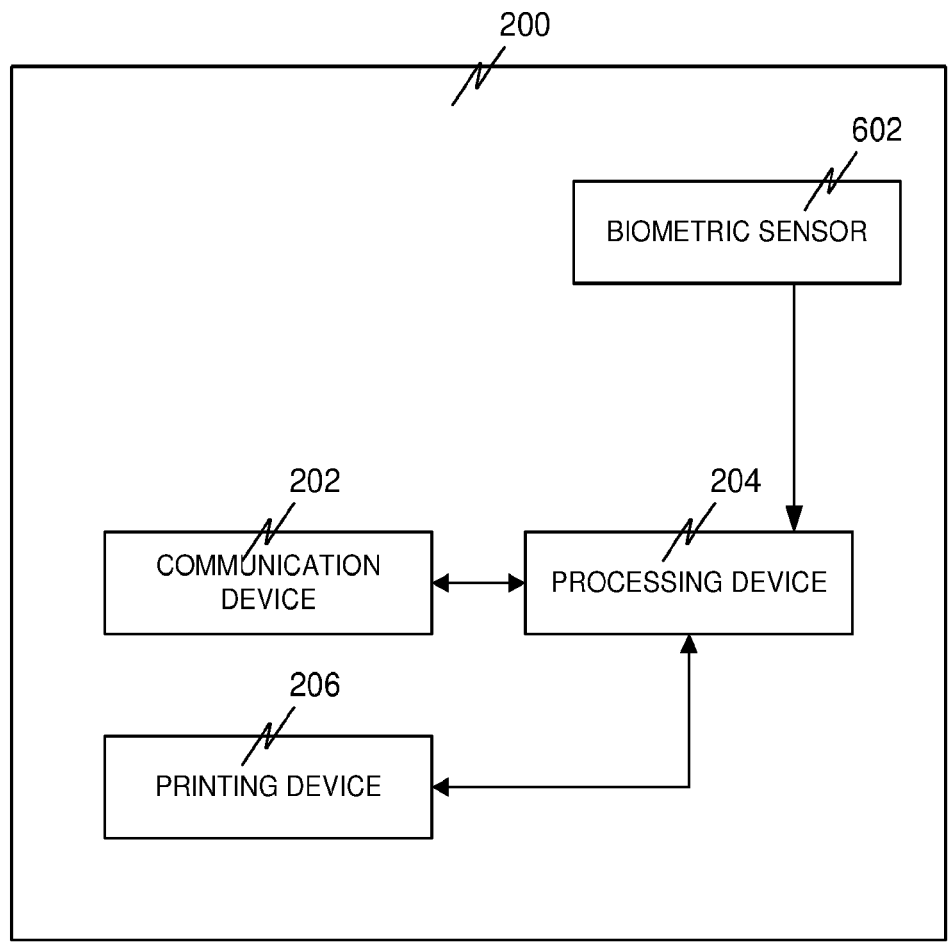
FIG. 6 illustrates a block diagram of the system for creating a label for labeling the intravenous infusion line, in accordance with some embodiments.

FIG. 6 illustrates a block diagram of the system 200 for creating a label for labeling the intravenous infusion line, in accordance with some embodiments.

In some embodiments, the system 200 may include a biometric sensor 602 (as shown in FIG. 6) communicatively coupled to the processing device 204. Further, the biometric sensor 602 may be configured for generating biometric data of a label administrator. Further, the processing device 204 may be configured for performing authentication of the label administrator based on the biometric data.

Figure 7:
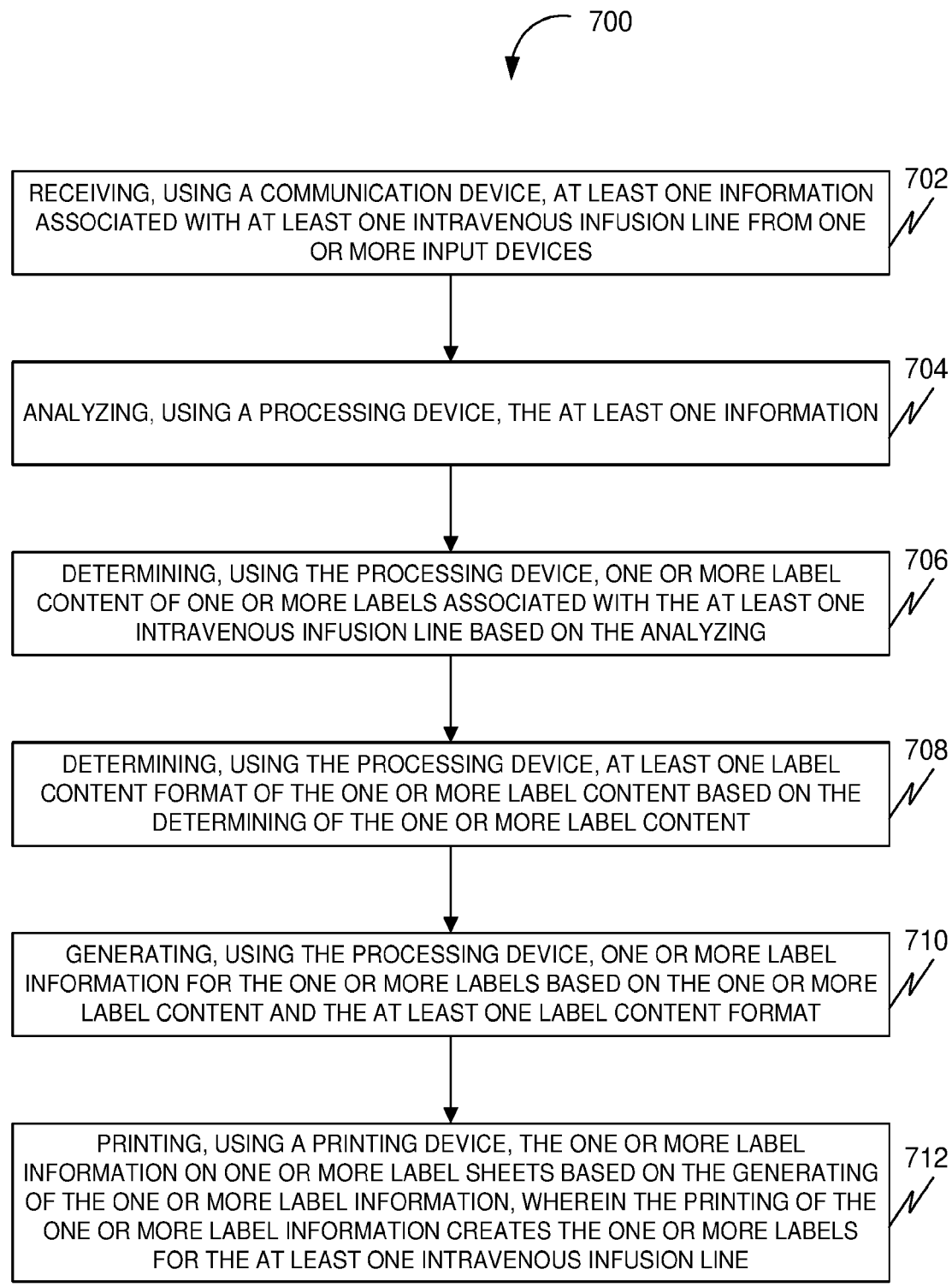
FIG. 7 illustrates a flowchart of a method for creating a label for labeling an intravenous infusion line, in accordance with some embodiments.

FIG. 7 illustrates a flowchart of a method 700 for creating a label for labeling an intravenous infusion line, in accordance with some embodiments. Accordingly, the method 700 may include a step 702 of receiving, using a communication device (such as the communication device 202), at least one information associated with at least one intravenous infusion line from one or more input devices (such as the one or more input devices 302-304).

Further, the method 700 may include a step 704 of analyzing, using a processing device (such as the processing device 204), the at least one information.

Further, the method 700 may include a step 706 of determining, using the processing device, one or more label content of one or more labels associated with the at least one intravenous infusion line based on the analyzing.

Further, the method 700 may include a step 708 of determining, using the processing device, at least one label content format of the one or more label content based on the determining of the one or more label content.

Further, the method 700 may include a step 710 of generating, using the processing device, one or more label information for the one or more labels based on the one or more label content and the at least one label content format.

Further, the method 700 may include a step 712 of printing, using a printing device (such as the printing device 206), the one or more label information on one or more label sheets based on the generating of the one or more label information, wherein the printing of the one or more label information creates the one or more labels for the at least one intravenous infusion line.

In some embodiments, the one or more labels may include adhesive.

In some embodiments, the printing device may include a thermal printer.

In some embodiments, the one or more input devices may include one or more of an optical scanner, an RFID reader, and a computing device.

In some embodiments, the method 700 may include scanning, using the optical scanner, one or more visual representations of the one or more information presents on one or more physical objects.

In some embodiments, the one or more label content formats may include a color code for the one or more label content. Further, the color code may include at least seven different colors corresponding to seven days of a calendar week.

In some embodiments, the one or more labels may include a primary label and one or more secondary labels. Further, a primary label content of the primary label may include user's information, medicine information, time and date of administration, a required tubing change time for intravenous infusion, a drug-specific warning, and location of the infusion' may s administration. Further, the one or more secondary labels may be configured for tagging the one or more intravenous infusion lines in one or more places of the one or more intravenous infusion lines. Further, the one or more secondary labels may include drug name and administration location information.

Figure 8:
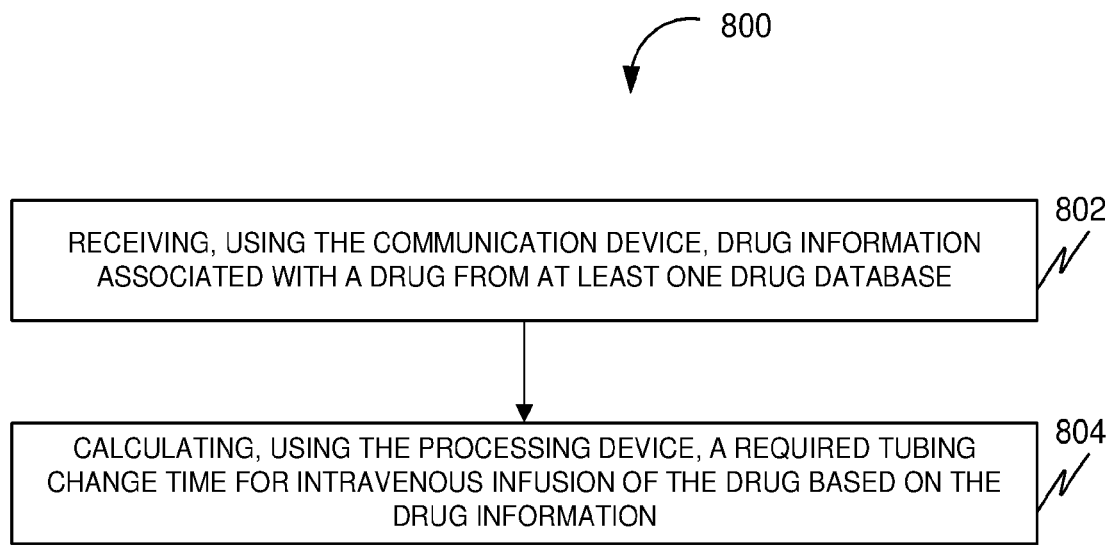
FIG. 8 illustrates a flowchart of a method for creating a label for labeling an intravenous infusion line, in accordance with some embodiments.

FIG. 8 illustrates a flowchart of a method 800 for creating a label for labeling an intravenous infusion line, in accordance with some embodiments.

Further, the method 800 may include a step 802 of receiving, using the communication device, drug information associated with a drug from at least one drug database.

Further, the method 800 may include a step 804 of calculating, using the processing device, a required tubing change time for intravenous infusion of the drug based on the drug information.

Figure 9:
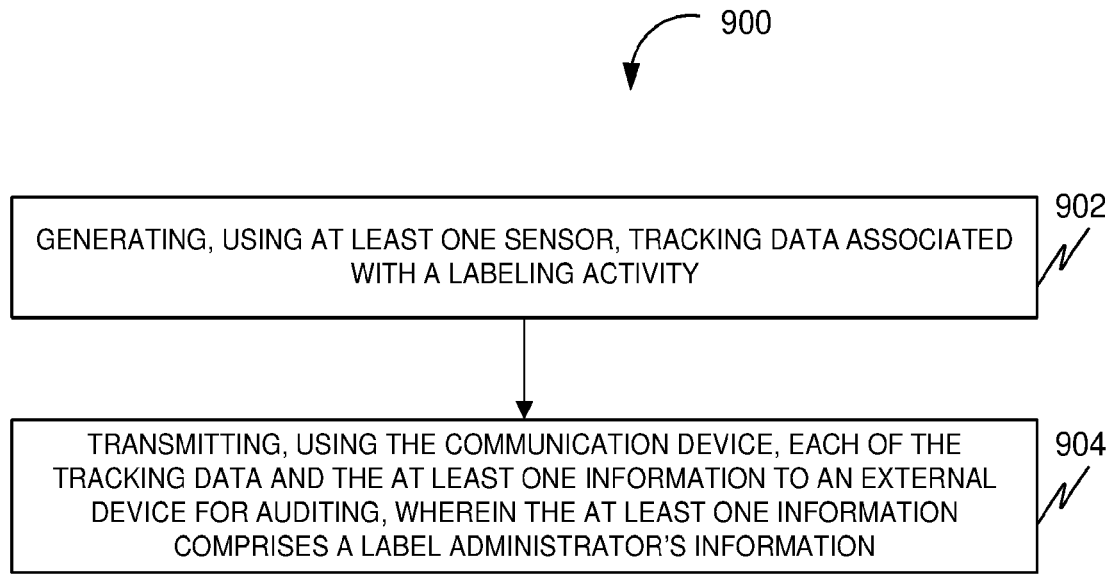
FIG. 9 illustrates a flowchart of a method for creating a label for labeling an intravenous infusion line, in accordance with some embodiments.

FIG. 9 illustrates a flowchart of a method 900 for creating a label for labeling an intravenous infusion line, in accordance with some embodiments.

Figure 10:
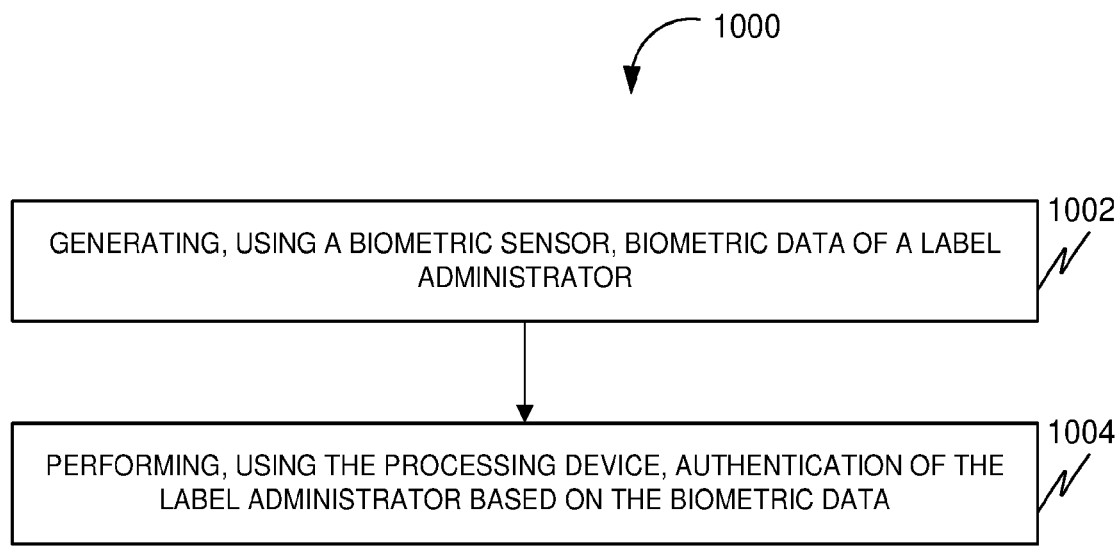
FIG. 10 illustrates a flowchart of a method for creating a label for labeling an intravenous infusion line, in accordance with some embodiments.

Further, the method 900 may include a step 902 of generating, using at least one sensor (such as the one or more sensors 402), tracking data associated with a labeling activity. Further, the method 900 may include a step 904 of transmitting, using the communication device, each of the tracking data and the at least one information to an external device (such as the external device 502) for auditing, wherein the at least one information comprises a label administrator's information FIG. 10 illustrates a flowchart of a method 1000 for creating a label for labeling an intravenous infusion line, in accordance with some embodiments. Further, the method 1000 may include a step 1002 of generating, using a biometric sensor (such as the biometric sensor 602), biometric data of a label administrator. Further, the method 1000 may include a step 1004 of performing, using the processing device, authentication of the label administrator based on the biometric data.

Figure 11:
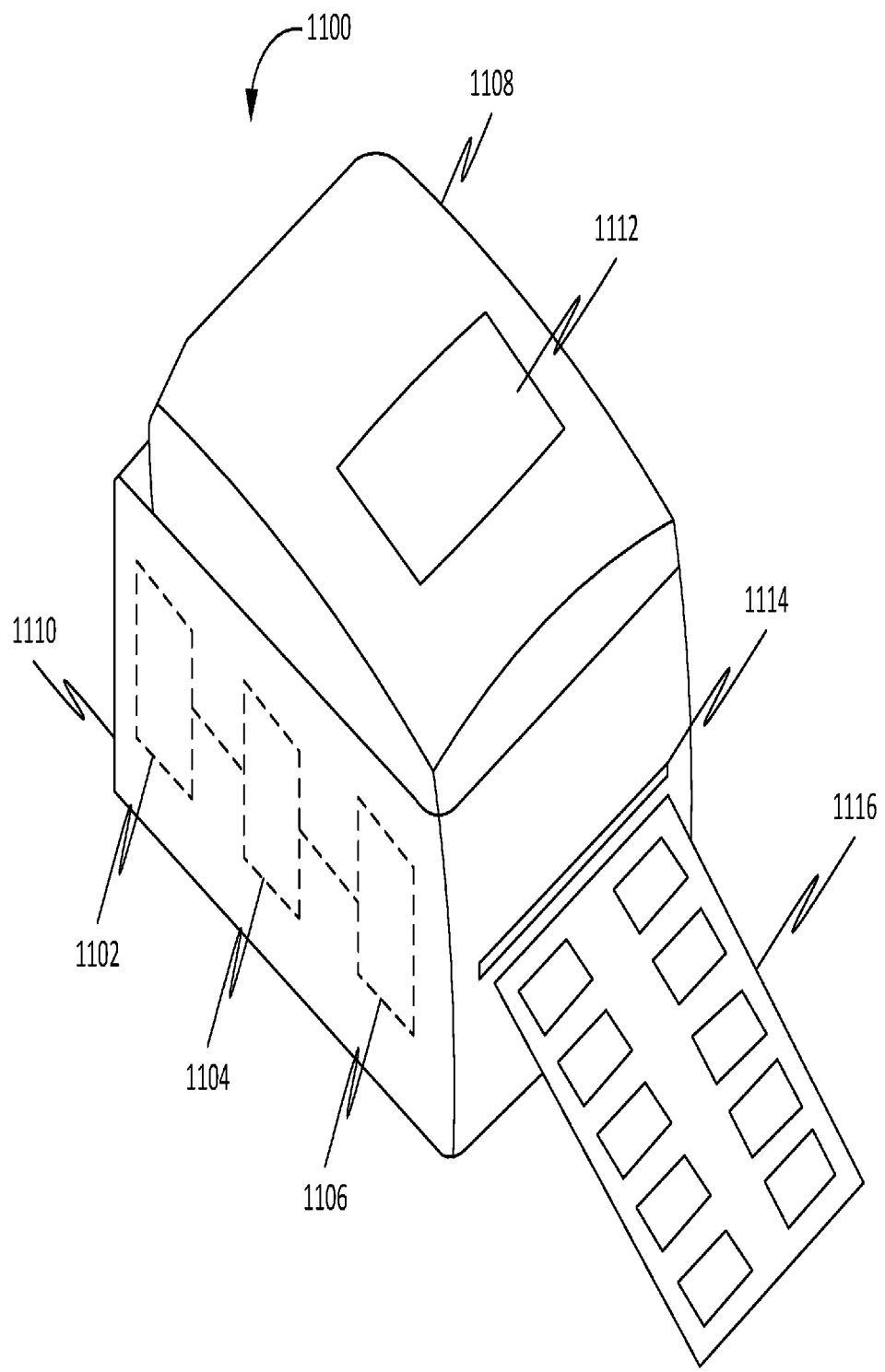
FIG. 11 is a top perspective view of a device for creating labels for labeling intravenous infusion lines, in accordance with some embodiments.

FIG. 11 is a top perspective view of a device 1100 for creating labels for labeling intravenous infusion lines, in accordance with some embodiments. Further, the device 1100 may include a communication device 1102, a processing device 1104, and a printing device 1106.

Further, the device 1100 may include a top 1108 pivotally connected to a base 1110. Further, the device 1100 may be configured for carrying one or more label sheets 1116. Further, the top 1108 may be pivotable between a closed position and at least one open position. Further, the device 1100 may include a cavity formed by the base 1110 for receiving the one or more label sheets 1116. Further, the cavity may be accessible to a user for disposing the one or more label sheets 1116 in the cavity in the at least one open position.

Further, the printing device 1106 may be enclosed within the base 1110. Further, the printing device 1106 may be configured for printing one or more label information on the one or more label sheets 1116 based on feeding of the one or more label sheets 1116. Further, the one or more label sheets 1116 may exit through an opening 1114 of the apparatus after the printing. Further, the one or more label sheets 1116 exited from the opening 1114 may be accessible to the user.

Figure 12:
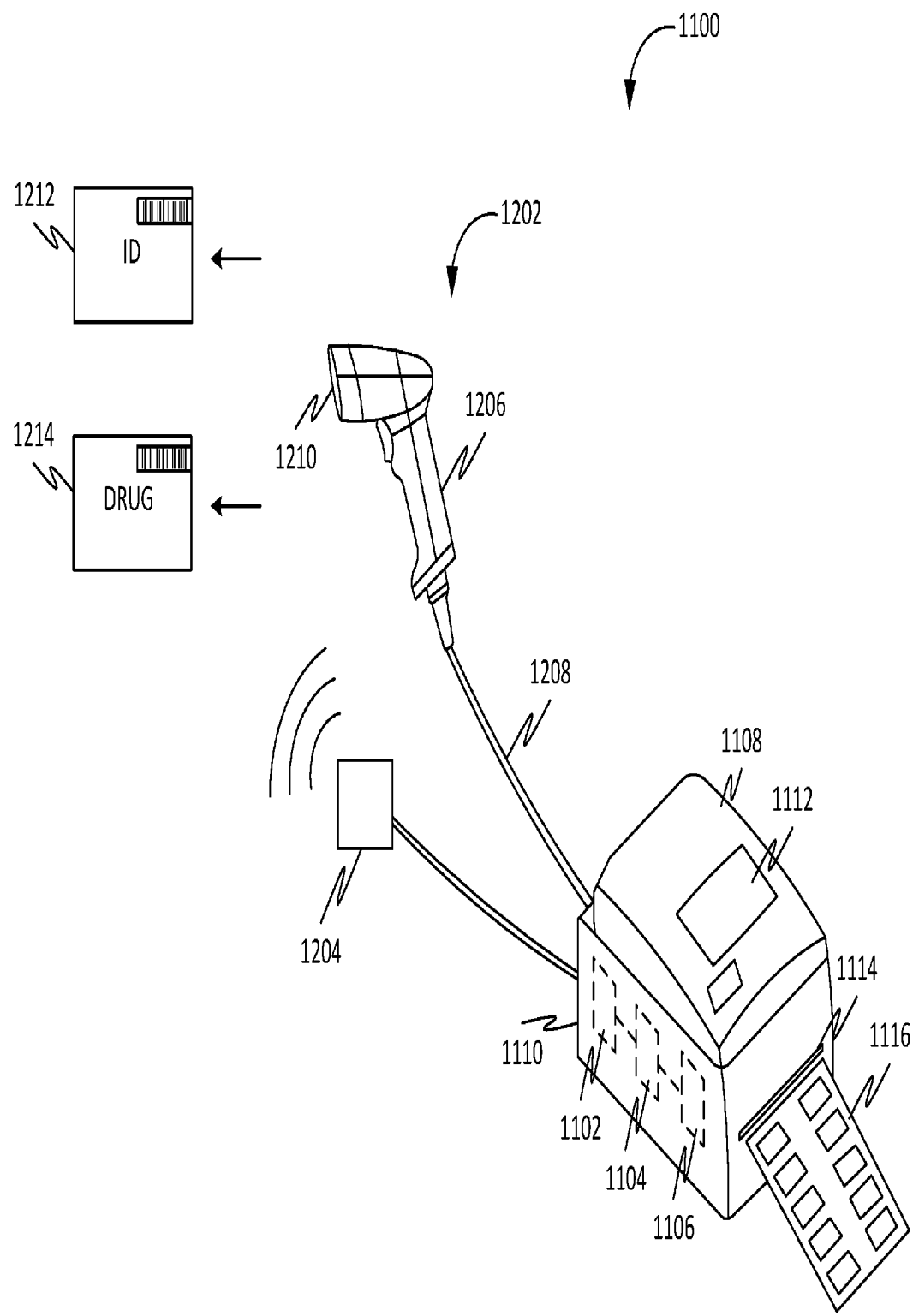
FIG. 12 is a top perspective view of the device with the one or more input devices, in accordance with some embodiments.

Further, the communication device 1102 may be configured for receiving at least one information associated with at least one intravenous infusion line from one or more input devices 1202-1204, as shown in FIG. 12. Further, the one or more input devices 1202-1204 may include a scanner 1202, an RFID reader 1204, etc. Further, the one or more input devices 1202-1204 may be configured for scanning at least one visual representation of the at least one information present on at least one physical object. Further, the at least one visual representation may include a QR code, a barcode, etc. Further, the at least one physical object may include a prescription, a medicine container, a tag, a doctor's identification, a user's identification 1212 (as shown in FIG. 12), a patient's identification, a medicine's identification 1214 (as shown in FIG. 12), etc. Further, the at least one information may include user information, medicine information, doctor information, etc.

Figure 13:
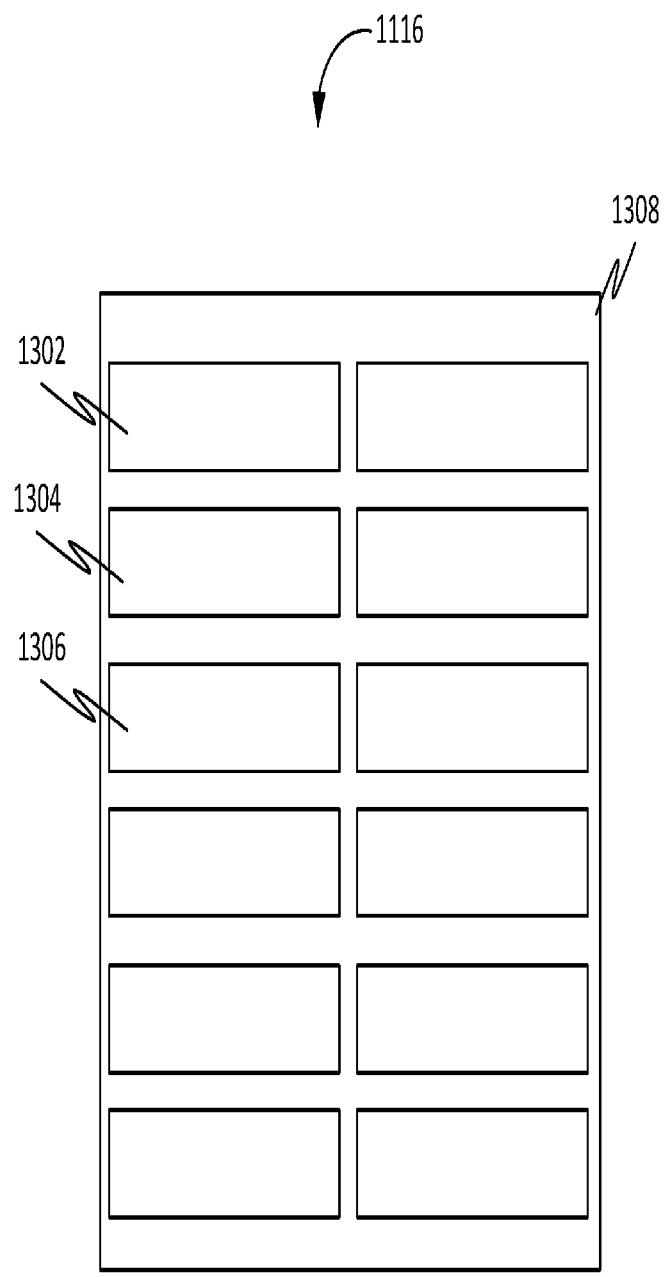
FIG. 13 is a front view of the one or more label sheets, in accordance with some embodiments.

Further, the processing device 1104 may be communicatively coupled with the communication device 1102 and the printing device 1106. Further, the processing device 1104 may be configured for analyzing the at least one information. Further, the processing device 1104 may be configured for determining one or more label content of one or more labels 1302-1306, as shown in FIG. 13, associated with the at least one intravenous infusion line based on the analyzing. Further, the processing device 1104 may be configured for determining at least one label content format of the one or more label content based on the determining of the one or more label content. Further, the processing device 1104 may be configured for generating the one or more label information for the one or more labels 1302-1306 based on the one or more label content and the at least one label content format. Further, the printing device 1106 may be configured for printing the one or more label information on the one or more label sheets 1116 based on the generating of the one or more label information. Further, the printing of the one or more label information may create the one or more labels 1302-1306 for the at least one intravenous infusion line.

Further, the printing of the one or more label information greatly reduces the time and effort to create the one or more labels 1302-1306 for the at least one intravenous infusion line and potentially eliminates human error. Further, the printing may include thermal printing of the one or more label information on the one or more label sheets 1116. Further, the one or more label information may be thermally printed on the one or more label sheets 1116. Further, the one or more label information may include the one or more label content in the at least one label content format.

Further, in some embodiments, the device 1100 may be provided with a display 1112 carried on the top 1108 and in viewing access to the user. Further, in some embodiments, the display 1112 displays information related to creating of the one or more labels 1302-1306 e.g., staff information, medicine information, date, time, and so forth, in addition to displaying prompts (e.g., "Scan Drug NDC") and information related to device's setup and device's settings.

Further, in some embodiments, the display 1112 may be manipulated by the user to manually input information, for example, with the use of a touch screen of the display 1112. Further, the display 1112 disposed on the top 1108 may be configured to read fingerprints of the user for security verification of the user prior to use.

Further, in some embodiments, the device 1100 may include one or more ports that allow communication with a computer for preprogramming.

Further, in some embodiments, the device 1100 may include a power cord (not shown) that provides electrical energy to the device 1100 via an electrical outlet.

Further, in some embodiments, the one or more input devices 1202-1204 may be communicatively coupled with the communication device 1102 using at least one of a wired communication channel and a wireless communication channel. Further, the one or more input devices 1202-1204 may include the scanner 1202. Further, the device 1100 associated with the scanner 1202 conductively connected with the device 1100 via a cord 1208, or associated with a mobile or stationary computer which includes a first scanner. Further, the scanner 1202 includes a handle 1206 integrally attached to a reader 1210. During use, the user may hold the handle 1206 and scan using the reader 1210, for example, a barcode associated with the user's identification 1212 and a barcode associated with the medicine's identification 1214 being used, as indicated by a medicine's box. Further, medicine bottles include barcodes adhered to the medicine bottle, which provide important medical information. Thus, the medicine's box represents a barcode directly from the medicine bottle.

FIG. 12 is a top perspective view of the device 1100 with the one or more input devices 1202-1204, in accordance with some embodiments.

FIG. 13 is a front view of the one or more label sheets 1116, in accordance with some embodiments. Further, the one or more label sheets 1116 may include the one or more labels 1302-1306 adhesively bonded to one or more sheets 1308. Further, the one or more labels 1302-1306 may include the one or more label information printed on the one or more labels 1302-1306. Further, the one or more labels 1302-1306 are removable from the one or more sheets 1308. Further, the one or more labels 1302-1306 adhesively adhere to the at least one intravenous infusion line. Further, in some embodiments, the one or more labels 1302-1306 do not include the one or more label information printed on the one or more labels 1302-1306. Further, the one or more labels 1302-1306 may include one or more prompts of the one or more label information printed on the one or more labels 1302-1306.

Figure 14:
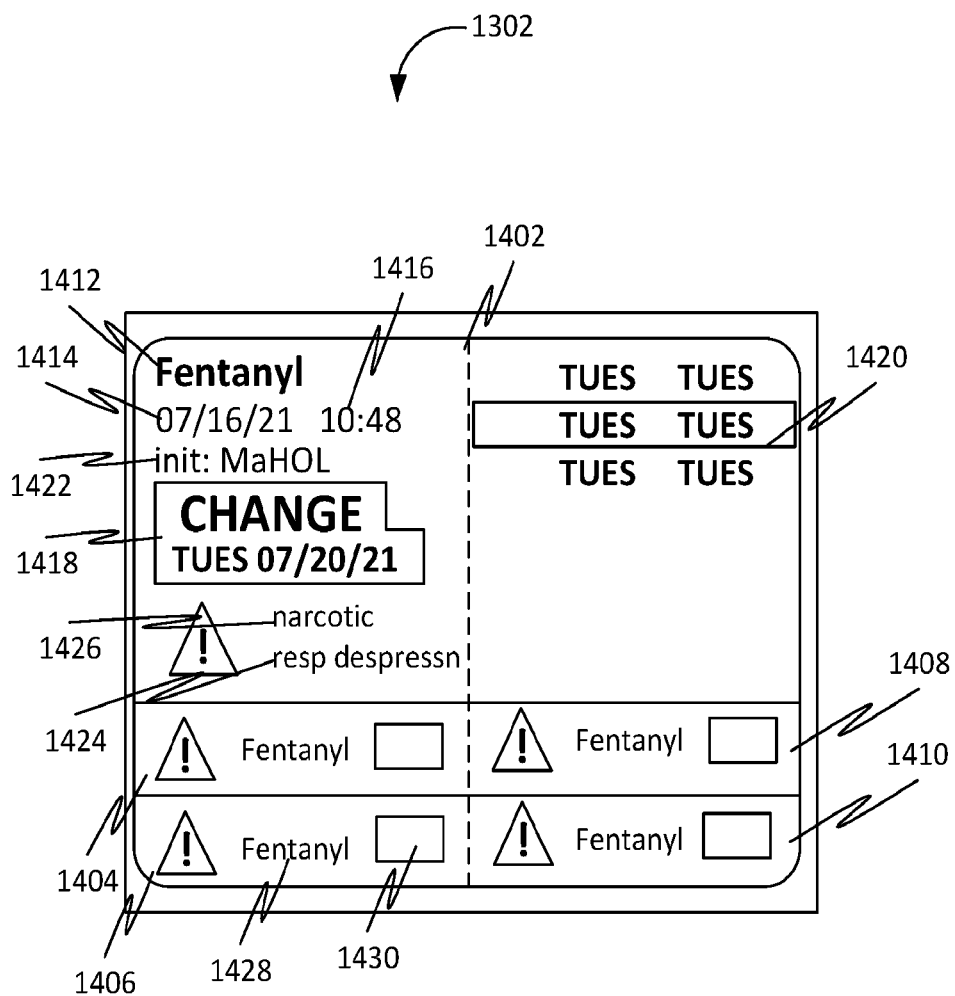
FIG. 14 is a front view of a label of the one or more labels, in accordance with some embodiments.

FIG. 14 is a front view of a label 1302 of the one or more labels 1302-1306, in accordance with some embodiments. Further, the label 1302 may include a primary label 1402 and one or more secondary labels 1404-1410. Further, the primary label 1402 may include one or more key information related to an intravenous infusion provided to the user using the at least one intravenous infusion line. Further, the one or more secondary labels 1404-1410 may be intended for tagging the at least one intravenous infusion line in one or more places of the at least one intravenous infusion line. Further, the one or more secondary labels 1404-1410 may be printed concurrently with the primary label 1402. Further, the primary label 1402 may include the drug name in a section 1412 of the primary label 1402, date of administration in a section 1414 of the primary label 1402, time of administration in a section 1416 of the primary label 1402, required tubing change time printed in a section 1418 of the primary label 1402, color-coded required tubing change time alert in a section 1420 of the primary label 1402, user (administrator) information in a section 1422 of the primary label 1402, drug warning in a section 1424 of the primary label 1402, and drug type information in a section 1426 of the primary label 1402. Further, a secondary label 1406 of the one or more secondary labels 1404-1410 may include drug name in a section 1428 of the secondary label 1406 and administration location information in a section 1430 of the secondary label 1406.

Figure 15:
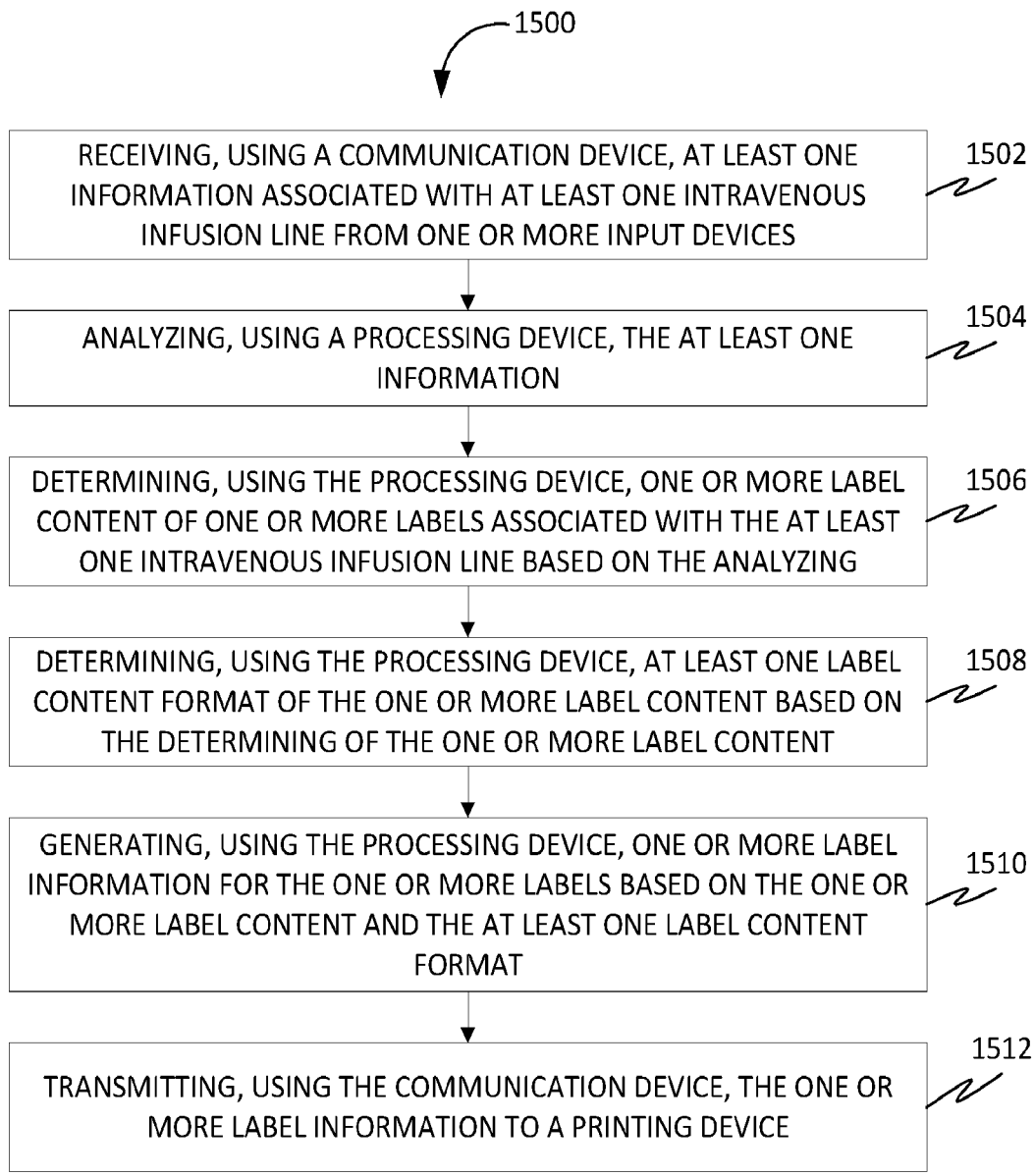
FIG. 15 is a flowchart of a method for creating labels for labeling intravenous infusion lines, in accordance with some embodiments.

FIG. 15 is a flowchart of a method 1500 for creating labels for labeling intravenous infusion lines, in accordance with some embodiments. Accordingly, at 1502, the method 1500 may include a step of receiving, using a communication device (such as the communication device 202), at least one information associated with at least one intravenous infusion line from one or more input devices.

Further, at 1504, the method 1500 may include a step of analyzing, using a processing device (such as the processing device 204), the at least one information.

Further, at 1506, the method 1500 may include a step of determining, using the processing device, one or more label content of one or more labels associated with the at least one intravenous infusion line based on the analyzing.

Further, at 1508, the method 1500 may include a step of determining, using the processing device, at least one label content format of the one or more label content based on the determining of the one or more label content.

Further, at 1510, the method 1500 may include a step of generating, using the processing device, one or more label information for the one or more labels based on the one or more label content and the at least one label content format.

Further, at 1512, the method 1500 may include a step of transmitting, using the communication device, the one or more label information to a printing device (such as the printing device 206). Further, the printing device may be configured for printing the one or more label information on the one or more label sheets based on the generating of the one or more label information. Further, the printing of the one or more label information may create the one or more labels for the at least one intravenous infusion line. Further, the printing may include thermal printing of the one or more label information on the one or more label sheets. Further, the one or more label information may be thermally printed on the one or more label sheets. Further, the one or more label information may include the one or more label content in the at least one label content format.

Figure 16:
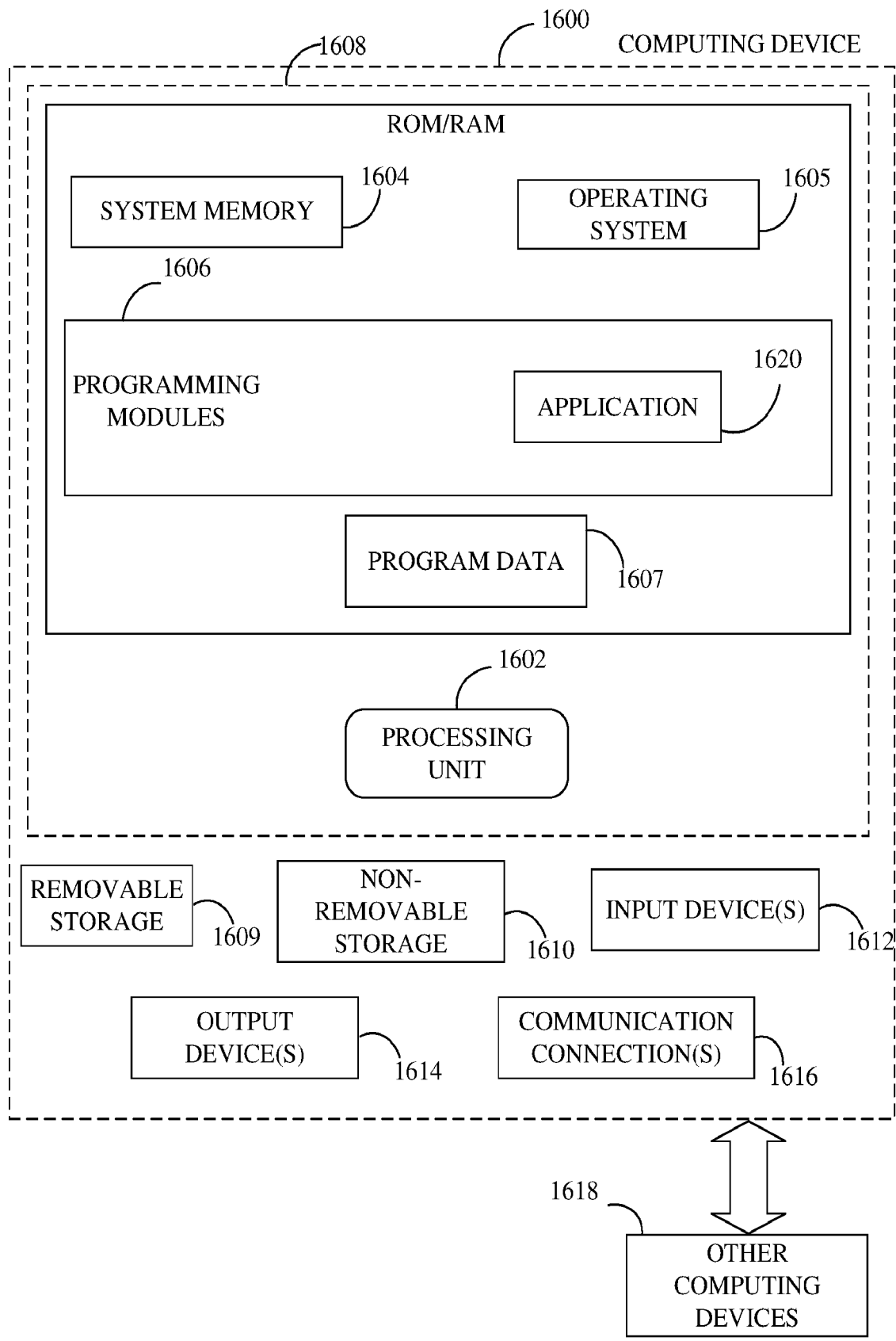
FIG. 16 is a block diagram of a computing device for implementing the methods disclosed herein, in accordance with some embodiments.

With reference to FIG. 16, a system consistent with an embodiment of the disclosure may include a computing device or cloud service, such as computing device 1600. In a basic configuration, computing device 1600 may include at least one processing unit 1602 and a system memory 1604. Depending on the configuration and type of computing device, system memory 1604 may comprise, but is not limited to, volatile (e.g., random-access memory (RAM)), non-volatile (e.g., read-only memory (ROM)), flash memory, or any combination. System memory 1604 may include operating system 1605, one or more programming modules 1606, and may include a program data 1607. Operating system 1605, for example, may be suitable for controlling computing device 1600's operation. In one embodiment, programming modules 1606 may include image-processing module, machine learning module and/or image classifying module. Furthermore, embodiments of the disclosure may be practiced in conjunction with a graphics library, other operating systems, or any other application program and is not limited to any particular application or system. This basic configuration is illustrated in FIG. 16 by those components within a dashed line 1608.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by a removable storage 1609 and a non-removable storage 1610. Computer storage media may include volatile and nonvolatile, removable and non-removable media implemented in any method or technology for storage of information, such as computer-readable instructions, data structures, program modules, or other data. System memory 1604, removable storage 1609, and non-removable storage 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a touch input device, a location sensor, a camera, a biometric sensor, etc. Output device(s) 1614 such as a display, speakers, a printer, etc. may also be included. The aforementioned devices are examples and others may be used.

Computing device 1600 may also contain a communication connection 1616 that may allow device 1600 to communicate with other computing devices 1618, such as over a network in a distributed computing environment, for example, an intranet or the Internet. Communication connection 1616 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 1604, including operating system 1605. While executing on processing unit 1602, programming modules 1606 (e.g., application 1620 such as a media player) may perform processes including, for example, one or more stages of methods, algorithms, systems, applications, servers, databases as described above. The aforementioned process is an example, and processing unit 1602 may perform other processes. Other programming modules that may be used in accordance with embodiments of the present disclosure may include sound encoding/decoding applications, machine learning application, acoustic classifiers, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 17:
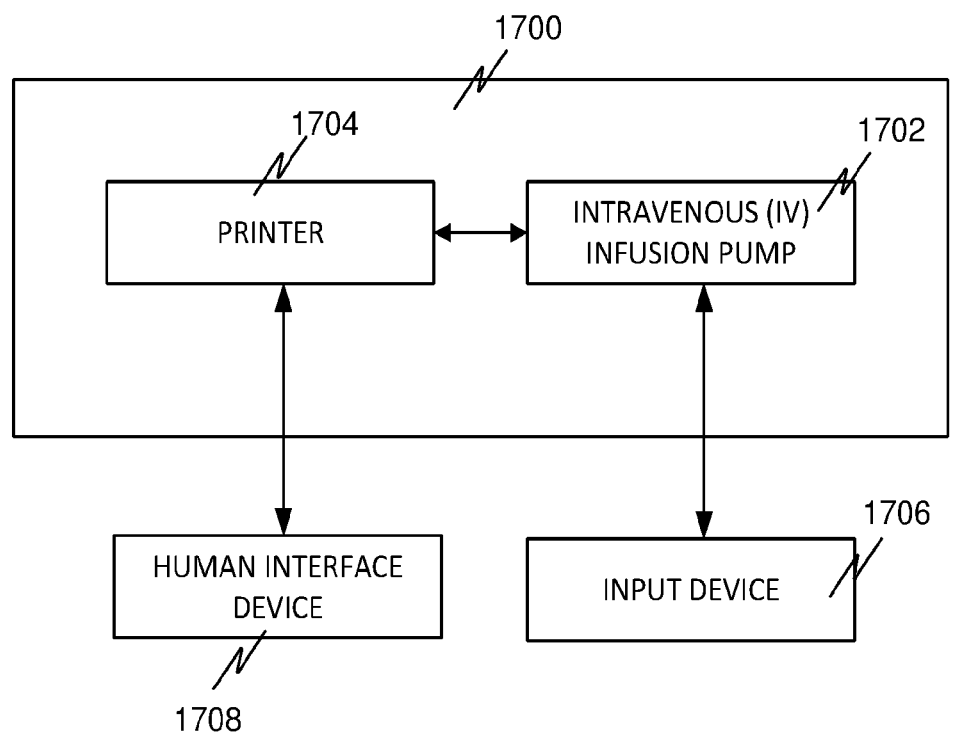
FIG. 17 is a block diagram of a system for creating a label for labeling an intravenous infusion line, in accordance with some embodiments.

FIG. 17 is a block diagram of a system 1700 for creating a label for labeling an intravenous infusion line, in accordance with some embodiments. Accordingly, the system 1700 may include a printer 1704 and an intravenous (IV) infusion pump 1702.

Further, the IV infusion pump 1702 may be configured for delivering at least one drug to at least one user using at least one intravenous infusion line. Further, the IV infusion pump 1702 may be programmable. Further, the IV infusion pump 1702 may be configured for receiving one or more information through at least one input device 1706 associated with the IV infusion pump 1702 for programming the IV infusion pump 1702. Further, the at least one input device 1706 may include one or more buttons on the IV infusion pump 1702. Further, the delivering of the at least one drug to the at least one user using the at least one intravenous line may be based on the programming. Further, the one or more information may include metadata such as a nurse's identification of a nurse, a nurse's name of the nurse, a drug's information of the at least one drug, etc. Further, the IV infusion pump 1702 may be configured for transmitting the metadata to the printer 1704. Further, the IV infusion pump 1702 may be comprised of a communication device.

Further, the printer 1704 may be configured for receiving the metadata from the IV infusion pump 1702. Further, the printer 1704 may be configured for processing the metadata. Further, the printer 1704 may be configured for determining one or more label content of one or more labels associated with the at least one intravenous infusion line based on the processing. Further, the printer 1704 may be configured for determining one or more label content formats of the one or more label content based on the determining of the one or more label content. Further, the printer 1704 may be configured for generating one or more label information for the one or more labels based on the one or more label content and the one or more label content formats. Further, the printer 1704 may be configured for printing the one or more label information on one or more label sheets based on the generating of the one or more label information. Further, the printing of the one or more label information creates the one or more labels for the at least one intravenous infusion line. Further, the printer 1704 may be comprised of a processing device and a printing device.

Further, in some embodiments, the at least one label content format may include a color code for the one or more label content. Further, the color code may include at least three different colors. Further, two of the three different colors correspond to two specific days of a week on which the at least one intravenous infusion line may be changed by a hospital as per a routine of the hospital. Further, the two specific days of the week may be Mondays and Thursdays. Further, a first color and a second color of the three colors may represent Mondays and Thursdays. Further, a third color of the three colors represents a day that may be a change date of a drug such as Propofol which needs to be changed much sooner than either Monday or Thursday.

Further, in some embodiments, the at least one label content format may include a color code for the one or more label content. Further, the one or more label content may include a drug's name, a medicine name, etc. Further, the color code for the drug's name, the medicine name, etc. may represent a type of drug and/or medicine such as narcotics.

Further, in some embodiments, the one or more labels may include one or more thermal labels. Further, the one or more thermal labels may have different colors instead of black under the white finish.

Further, in some embodiments, the printer 1704 may be configured for determining an absence of a drug of the at least one drug in a database of the printer 1704 based on the processing. Further, the printer 1704 may be configured for generating a prompt for the nurse to select the drug and/or a number of hours to expire for the one or more labels. Further, the printer 1704 may be configured for displaying the prompt using a human interface device 1708 associated with the printer 1704. Further, the printer 1704 may be configured for receiving a selection of the drug and/or the number of hours to expire using the human interface device 1708. Further, selecting the number of hours to expire allow the nurse to simply handwrite a name of the drug on the one or more labels.

Although the invention has been explained in relation to its preferred embodiment, it is to be understood that many other possible modifications and variations can be made without departing from the spirit and scope of the invention.

What is claimed is:

1. A system for creating a label for labeling an intravenous infusion line, the system comprising:
    a communication device configured for receiving at least one information associated with at least one intravenous infusion line from one or more input devices;
    a processing device communicatively coupled with the communication device, wherein the processing device is configured for:
        analyzing the at least one information;
        determining one or more label content of one or more labels associated with the at least one intravenous infusion line based on the analyzing;
        determining at least one label content format of the one or more label content based on the determining of the one or more label content, wherein the at least one label content format comprises a color code, wherein the color code comprises seven different colors corresponding to seven days of a calendar week;
        generating one or more label information for the one or more labels based on the one or more label content and the at least one label content format;
    a printing device communicatively coupled with the processing device, wherein the printing device is configured for printing the one or more label information on one or more label sheets based on the generating of the one or more label information, wherein the printing device comprises a thermal printer, wherein the one or more label sheets comprises a paper with a thermochromic coating, wherein the one or more label sheets comprises a plurality of sections, wherein the printing of the one or more label information further comprises thermally printing a required tubing change time alert on a section of the plurality of sections, wherein the thermally printing in the section color codes the required tubing change time alert with a color from the seven different colors representing a day of the seven days corresponding to the required tubing change time alert, wherein the printing of the one or more label information creates the one or more labels for the at least one intravenous infusion line.

2. The system of claim 1, wherein the one or more labels comprise adhesive.

3. The system of claim 1, wherein the one or more input devices further comprises at least one of an optical scanner, an RFID reader, and a computing device.

4. The system of claim 3, wherein the optical scanner is configured for scanning at least one visual representation of the at least one information present on at least one physical object.

5. The system of claim 1, wherein the one or more labels comprises a primary label and one or more secondary labels, wherein a primary label content of the primary label comprises user's information, medicine information, time and date of administration, a required tubing change time for intravenous infusion, a drug-specific warning, and location of the infusion's administration, wherein the one or more secondary labels are configured for tagging the at least one intravenous infusion line in one or more places of the at least one intravenous infusion line, wherein the one or more secondary labels comprises drug name and administration location information.

6. The system of claim 1, wherein the one or more input devices comprises an intravenous (IV) infusion pump, wherein the IV infusion pump is programmed using the at least one information, wherein the IV infusion pump is configured for delivering a drug to a user using the at least one intravenous infusion line based on the programming of the IV infusion pump, wherein the communication device is configured for receiving drug information associated with the drug from at least one drug database, wherein the processing device is further configured for calculating a required tubing change time for the at least one intravenous infusion line associated with the drug based on the drug information.

7. The system of claim 1 further comprising at least one sensor communicatively coupled to the processing device, wherein the at least one sensor is configured for generating tracking data associated with a labeling activity, wherein the tracking data comprises a location and a time for the labeling activity, wherein the labeling activity comprises each of an act of scanning at least one visual representation of the at least one information present on at least one physical object and an act of attaching the one or more labels to the at least one intravenous infusion line, wherein the communication device is further configured for transmitting each of the tracking data and the at least one information to an external device for auditing, wherein the at least one information comprises a label administrator's information.

8. The system of claim 1 further comprising a biometric sensor communicatively coupled to the processing device, wherein the biometric sensor is configured for generating biometric data of a label administrator, wherein the processing device is configured for performing authentication of the label administrator based on the biometric data.

9. A method of creating a label for labeling an intravenous infusion line, the method comprising:
receiving, using a communication device, at least one information associated with at least one intravenous infusion line from one or more input devices;
analyzing, using a processing device, the at least one information;
determining, using the processing device, one or more label content of one or more labels associated with the at least one intravenous infusion line based on the analyzing;
determining, using the processing device, at least one label content format of the one or more label content based on the determining of the one or more label content, wherein the at least one label content format comprises a color code, wherein the color code comprises seven different colors corresponding to seven days of a calendar week;
generating, using the processing device, one or more label information for the one or more labels based on the one or more label content and the at least one label content format; printing, using a printing device, the one or more label information on one or more label sheets based on the generating of the one or more label information, wherein the printing device comprises a thermal printer, wherein the one or more label sheets comprises a paper with a thermochromic coating, wherein the one or more label sheets comprises a plurality of sections, wherein the printing of the one or more label information further comprises thermally printing a required tubing change time alert on a section of the plurality of sections, wherein the thermally printing in the section color codes the required tubing change time alert with a color from the seven different colors representing a day of the seven days corresponding to the required tubing change time alert, wherein the printing of the one or more label information creates the one or more labels for the at least one intravenous infusion line.

10. The method of claim 9, wherein the one or more labels comprise adhesive.

11. The method of claim 9, wherein the one or more input devices further comprises at least one of an optical scanner, an RFID reader, and a computing device.

12. The method of claim 11 further comprising scanning, using the optical scanner, at least one visual representation of the at least one information present on at least one physical object.

13. The method of claim 9, wherein the one or more labels comprises a primary label and one or more secondary labels, wherein a primary label content of the primary label comprises user's information, medicine information, time and date of administration, a required tubing change time for intravenous infusion, a drug-specific warning, and location of the infusion's administration, wherein the one or more secondary labels are configured for tagging the at least one intravenous infusion line in one or more places of the at least one intravenous infusion line, wherein the one or more secondary labels comprises drug name and administration location information.

14. The method of claim 9, wherein the one or more input devices comprises an intravenous (IV) infusion pump, wherein the IV infusion pump is programmed using the at least one information, wherein the IV infusion pump is configured for delivering a drug to a user using the at least one intravenous infusion line based on the programming of the IV infusion pump, wherein the method comprises:
receiving, using the communication device, drug information associated with the drug from at least one drug database; and
calculating, using the processing device, the required tubing change time for the at least one intravenous infusion line associated with the drug based on the drug information.

15. The method of claim 9 further comprising:
generating, using at least one sensor, tracking data associated with a labeling activity, wherein the tracking data comprises a location and a time for the labeling activity, wherein the labeling activity comprises each of an act of scanning at least one visual representation of the at least one information present on at least one physical object and an act of attaching the one or more labels to the at least one intravenous infusion line; and
transmitting, using the communication device, each of the tracking data and the at least one information to an external device for auditing, wherein the at least one information comprises a label administrator's information.

16. The method of claim 9 further comprising:
generating, using a biometric sensor, biometric data of a label administrator; and
performing, using the processing device, authentication of the label administrator based on the biometric data.

* * * * *